US009881336B2

(12) United States Patent
Poon

(10) Patent No.: US 9,881,336 B2
(45) Date of Patent: Jan. 30, 2018

(54) FOREIGN CURRENCY EXCHANGE SYSTEM AND METHOD

(75) Inventor: Ferdinand Poon, Los Angeles, CA (US)

(73) Assignee: LEFTOVERCASH, INC., Los Angeles, CA (US)

(*) Notice: Subject to any disclaimer, the term of this patent is extended or adjusted under 35 U.S.C. 154(b) by 0 days.

(21) Appl. No.: 13/070,815

(22) Filed: Mar. 24, 2011

(65) Prior Publication Data
US 2011/0238549 A1 Sep. 29, 2011

Related U.S. Application Data

(60) Provisional application No. 61/317,580, filed on Mar. 25, 2010.

(51) Int. Cl.
G06Q 40/00 (2012.01)
G06Q 20/38 (2012.01)

(52) U.S. Cl.
CPC ........... *G06Q 40/00* (2013.01); *G06Q 20/381* (2013.01)

(58) Field of Classification Search
USPC ............................... 705/35, 36 R, 37, 43, 69
See application file for complete search history.

(56) References Cited

U.S. PATENT DOCUMENTS

| 5,895,456 | A | 4/1999 | Beale et al. |
| 6,659,259 | B2 | 12/2003 | Knox et al. |
| 6,763,924 | B2 | 7/2004 | Olbrich |
| 2002/0179401 | A1* | 12/2002 | Knox ..................... B65G 13/04 193/1 |
| 2003/0105714 | A1* | 6/2003 | Alarcon-Luther ..... G06Q 20/00 705/41 |
| 2003/0191722 | A1 | 10/2003 | Thompson et al. |
| 2004/0181481 | A1 | 9/2004 | Carter |
| 2005/0038714 | A1 | 2/2005 | Bonet et al. |
| 2005/0045714 | A1 | 3/2005 | Hermanussen |
| 2007/0272743 | A1 | 11/2007 | Christie et al. |
| 2008/0301047 | A1* | 12/2008 | Fish ..................... G06Q 20/105 705/41 |
| 2009/0063344 | A1* | 3/2009 | Travis ................ G06Q 20/1085 705/43 |
| 2010/0070424 | A1* | 3/2010 | Monk .................. G06Q 10/067 705/318 |

OTHER PUBLICATIONS

"IBM Sells Swiss Self-Service Devices", Bank Network News, Mar. 12, 1998, p. 8.*
"Thomas Cook Opens Airport Currency Exchange ATM at DFW" by Wills, Belinda, Business Press, Jun. 26, 1998, vol. 11 Issue 9, p. 4. 1/4p.*
PCT International Preliminary Search Report on Patentability dated Mar. 25, 2011.*

(Continued)

Primary Examiner — Alexander Kalinowski
Assistant Examiner — Blane Lickteig
(74) Attorney, Agent, or Firm — DLA Piper LLP (US)

(57) ABSTRACT

A foreign currency exchange system and method are provided that allows the user to exchange various foreign currency for a physical or electronic gift card, a donation to a charity, a stored foreign currency value card and/or a multi-currency debit cash card.

17 Claims, 15 Drawing Sheets

(56) References Cited

OTHER PUBLICATIONS

Betten and Resch extended European search report dated Feb. 13, 2014.*
PCT International Preliminary Report on Patentability of PCT/US11/29938; dated Sep. 25, 2012 (5 pgs.).
Extended European Search Report of EP 11760287.0; dated Feb. 13, 2014 (5 pgs.).
Aug. 21, 1998 Orlando Business Journal Article, "Malled! Company putting currency exchange on automatic", Cindy Barth, Author.
European Communication pursuant to Article 94(3) EPC of EP 11760287.0; dated Feb. 27, 2015 (6 pgs.).
PCT/US11/29938, International Search Report, dated May 9, 2011.
PCT/US11/29938, Written Opinion, dated May 9, 2011.

* cited by examiner

FOREIGN CURRENCY EXCHANGE SYSTEM AND METHOD

PRIORITY CLAIMS/RELATED APPLICATIONS

This patent application claims the benefit, under 35 USC 119(e) and 120 to U.S. Provisional Patent Application Ser. No. 61/317,580, filed on Mar. 25, 2010 and entitled "FOREIGN CURRENCY EXCHANGE SYSTEM AND METHOD", the entirety of which is incorporated herein by reference.

FIELD

The disclosure relates generally to a system and method for exchanging foreign currency.

BACKGROUND

Systems exist that allow a user to buy a giftcard/pre-paid phone card from a stand-alone kiosk. These systems typically require the user to insert money of the country in which the kiosk is located (US dollars in the United States) to receive the giftcard and pre-paid phone card.

Systems also exist that allow a passenger on an airplane to exchange currency from a departure country of the airplane to currency of the destination country of the airplane. The system is designed to, based on the flight management system of the airplane, only dispense currency for the next destination country to the user. The system also allows the user to purchase a telephone card or gaming card using a credit card.

At least one system made by Foreign Currency Exchange Corp. is situated at malls and exchanges foreign currency for US dollars. However, it is desirable to provide a system and method that can exchange foreign currency for gift cards and/or to facilitate a donation and it is to this end that the disclosure is directed.

DETAILED DESCRIPTION OF ONE OR MORE EMBODIMENTS

The disclosure is particularly applicable to a kiosk based foreign currency exchange system as described and illustrated and it is in this context that the disclosure will be described. It will be appreciated, however, that the system and method has greater utility.

Figure 1A:
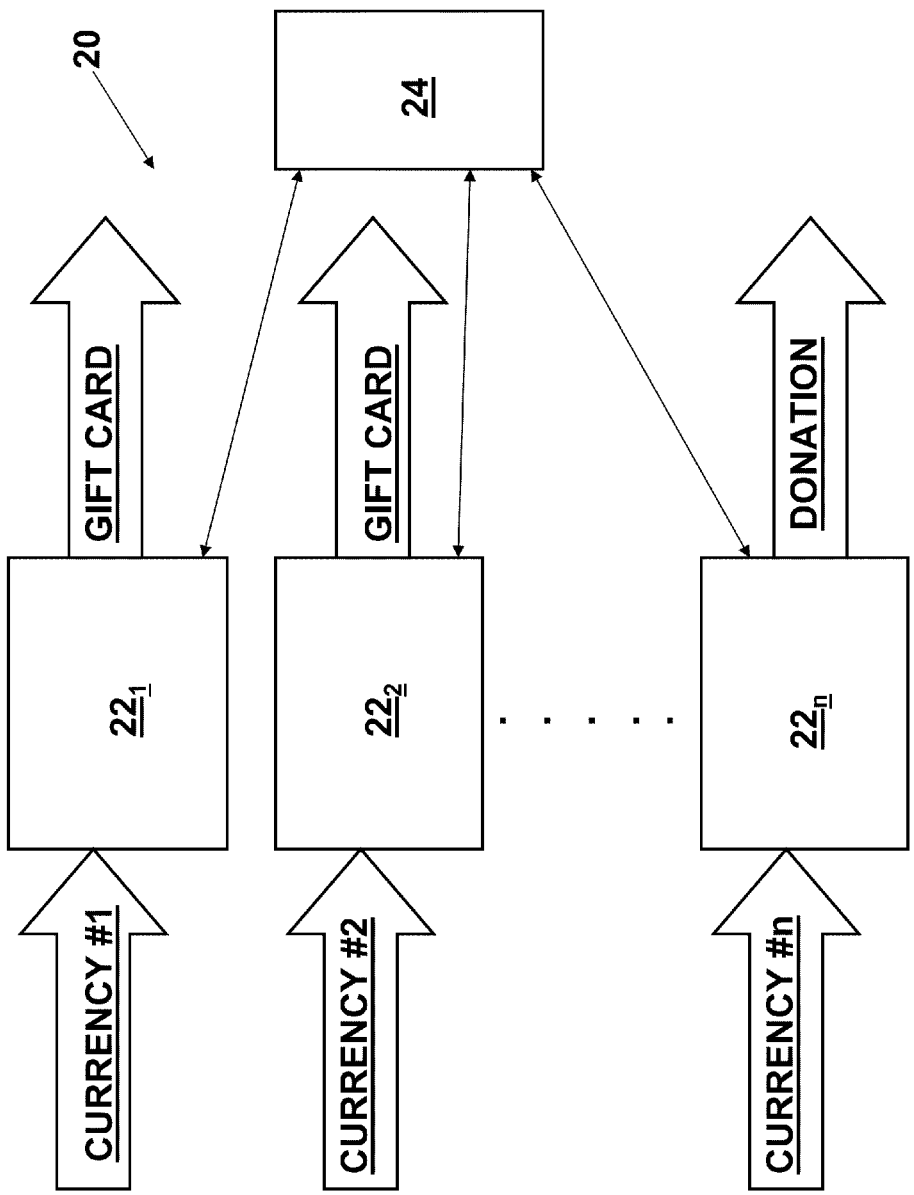
FIG. 1A illustrates an example of a foreign currency exchange system.

FIG. 1A illustrates an example of a foreign currency exchange system 20. The system 20 may comprise one or more kiosks 22 (such as kiosk $22_1$, $22_2$, . . . , $22n$) located at one or more different locations (such as at different airports or other locations) that each accept various different foreign currencies (both bills and/or coins), determine the value of the foreign currency in the currency of the country in which the kiosk is located (for example, the United States, France, etc.) based on the current (updated daily) foreign exchange values and then allows the user to receive a gift card (physical or electronic) and/or make a donation that is equal to the value of the foreign currency in the currency of the country in which the kiosk is located when the user inserts their foreign currency into the kiosk. The physical gift card may be like those sold by Powell's Books (books at www.powells.com as one non-limiting example) and the electronic gift cards may be like those sold by Shutterfly (www.shutterfly.com) which is an Internet-based photo publishing company. For purposes of this disclosure, foreign currency means any currency (bills and coins) for a country that is not the country in which the kiosk is located. For example, a kiosk in the United States may be able to exchange currency from South Korea, Japan, Europe, China, Canada, etc. while a kiosk in China may be able to exchange currency from the United States, South Korea, Japan, Europe, Canada, etc. It is important to note that each kiosk is not limited to any particular foreign currencies or number of foreign currencies.

Figure 1B:
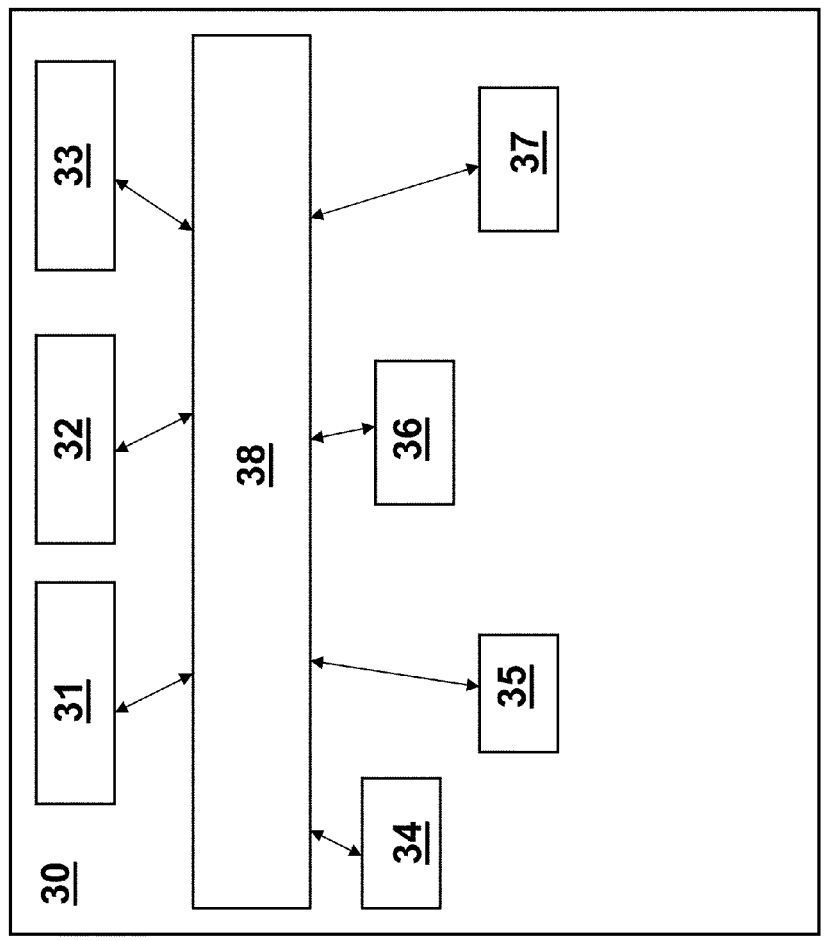
FIG. 1B illustrates an example of a kiosk that may be used with the foreign currency exchange system.

FIG. 1B illustrates an example of the kiosk 22 that may be used with the foreign currency exchange system 20. Each kiosk 22 may be a piece of hardware that contains a housing 30, a display screen 31 (that may be, in one implementation a 19" LCD Monitor and a 19" Resistive touch screen overlay w/USB interface), a lockable interior space, a user input device 32 (touchscreen, keyboard, etc.), a speaker system 33, one or more card dispenser unit(s) 34 (that may be, in one implementation a commercially available Hemisphere West CDT-200 Card Dispensers), a printer 35 (such as a thermal printer that may be a commercially available Swecoin TTP2030 80 mm Thermal Printer in one implementation), one or more currency acceptors units 36 (that may be, in one implementation one or more coin acceptor unit(s) that may be a commercially available Hemisphere West EMP800 USB Coin Acceptors and one or more bill acceptor unit(s) that may be a commercially available MEI SC USB Cashflow with 500 bill cashbox, one or more bill acceptors that receive and store the different currency separately, such as a commercially available MEI SC USB Cashflow with 500 bill cashbox for each currency in one implementation, a credit card swipe mechanism 37 and a core processing unit based computer 38 (with memory) that operates and manages the other components of the kiosk electrically connected to the other components of the kiosk as shown in FIG. 1B. In one implementation, the core processing unit based computer 38 may be a Dell Pentium SFF GX760 Dual Core E2200/2.2 GHz 1M, 800 FSB, 1 GB RAM, 80 GB SATA 3.0 Gb/s and 8 MB DataBurst Cache, Floppy, Integrated Intel, GMA4500 Video with up to 256 MB shared memory, integrated NIC card, 10/100/1000, 24X DVD/CD-ROM, SoundBlaster compatible, and Windows XP Pro OS.

These components allow each kiosk to, among other things, interact with the user using the user interfaces described below to accept foreign currency (bills and/or coins), tabulate and calculate the equivalent value in the local currency, return a physical gift card and/or email an electronic gift card and print a receipt for the user. The system 20 may also have a backend system 24 that can communicate with each kiosk in some fashion to remotely update and change the kiosk user interface, to upload e-gift card certificate codes and handle the credit card clearing operations as needed. For purposes of the currency exchange, the kiosk, in one embodiment, may store, in memory, the current exchange rates and then perform the currency exchange calculation internally within the kiosk. In another embodiment, each kiosk may be periodically updated (wirelessly or via wired network) with the current foreign exchange rates from a well known foreign exchange system. In yet another embodiment, the kiosk may contact a foreign exchange partner who performs the foreign exchange and sends the results back to the kiosk.

Figure 2A:
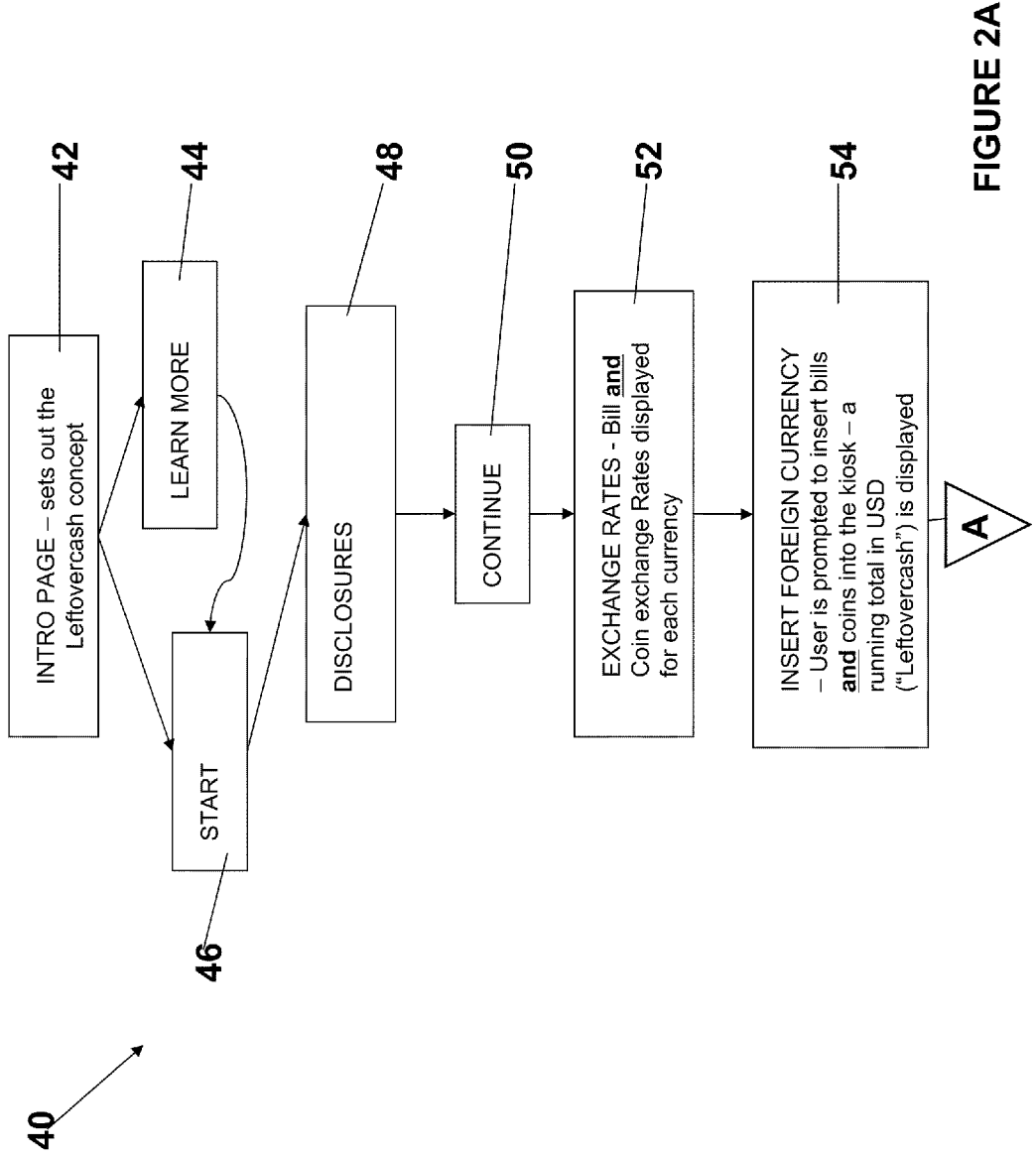
FIGS. 2A-2C illustrate an example of a method for foreign currency exchange using the foreign currency exchange system.
Figure 2B:
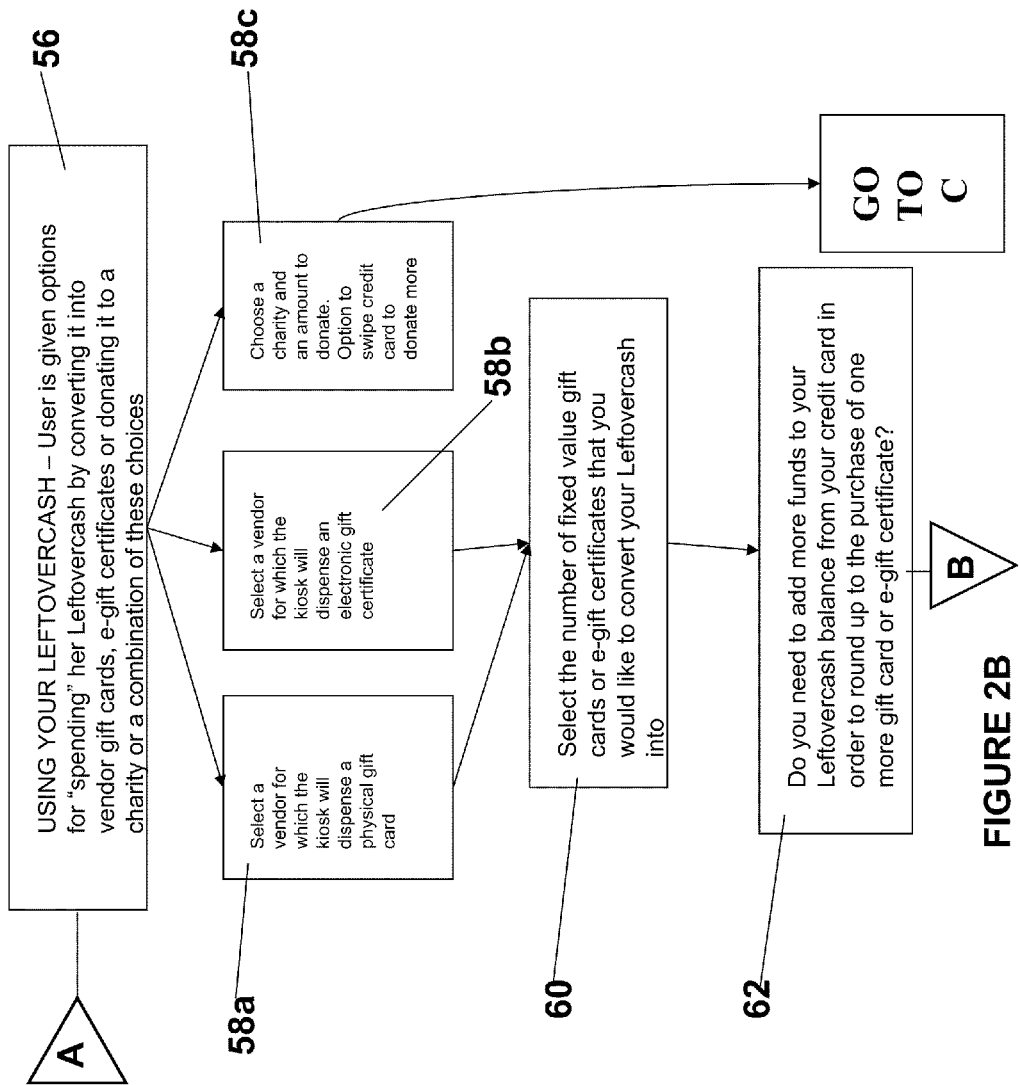
Figure 2C:
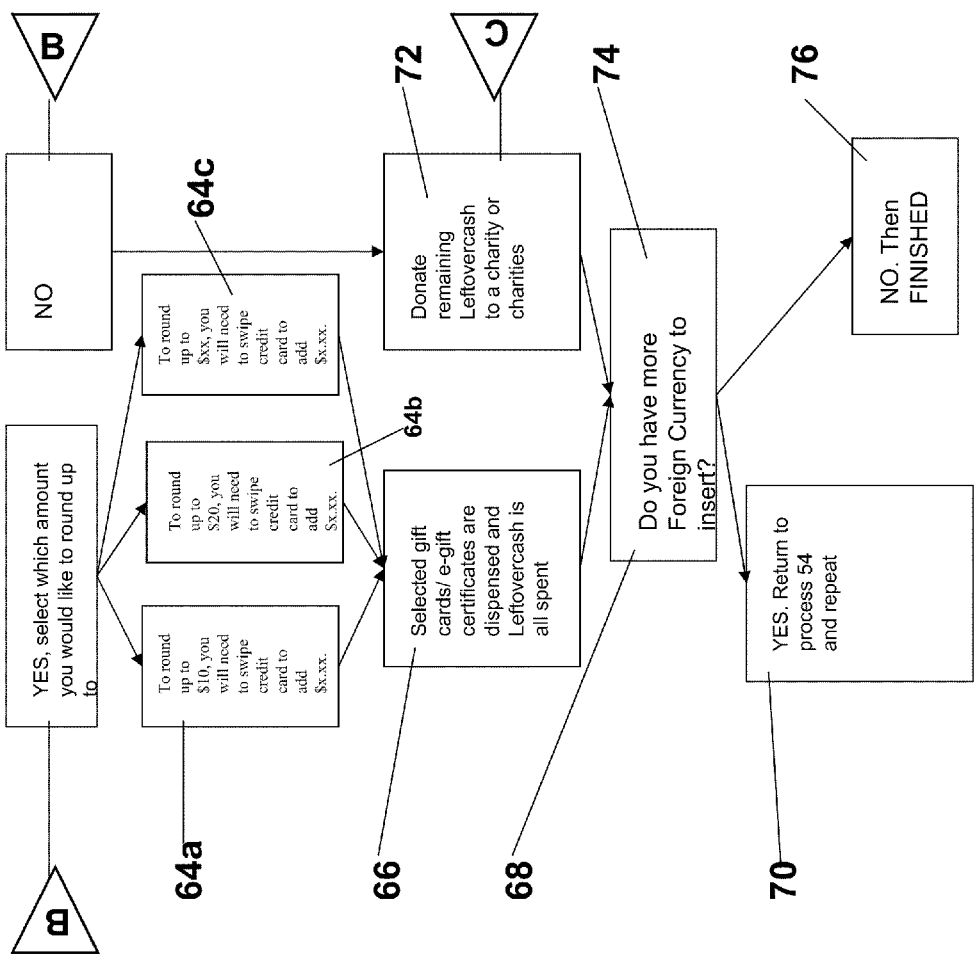
Figure 3A:
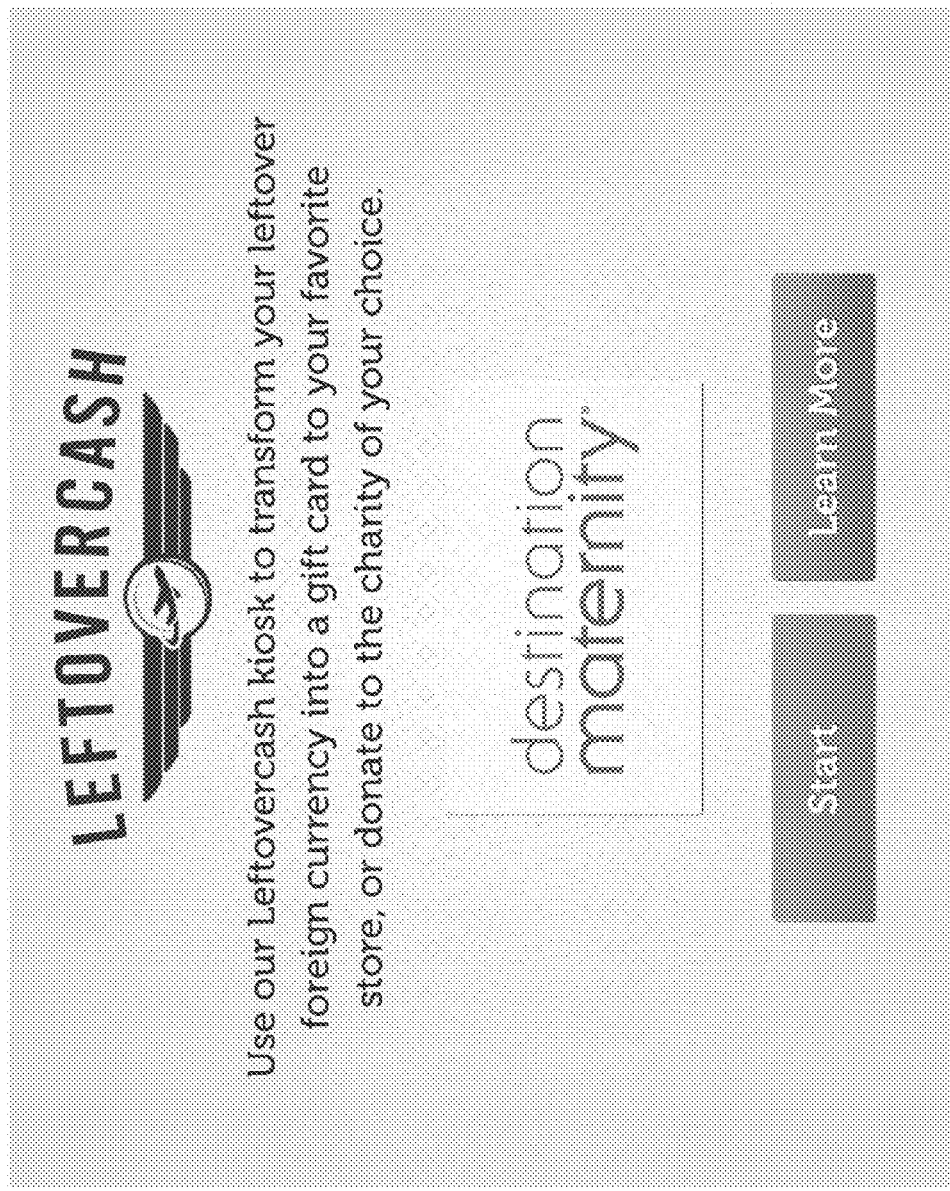
FIGS. 3A and 3B illustrate examples of a home screen user interface of a kiosk of the foreign currency exchange system.
Figure 3B:
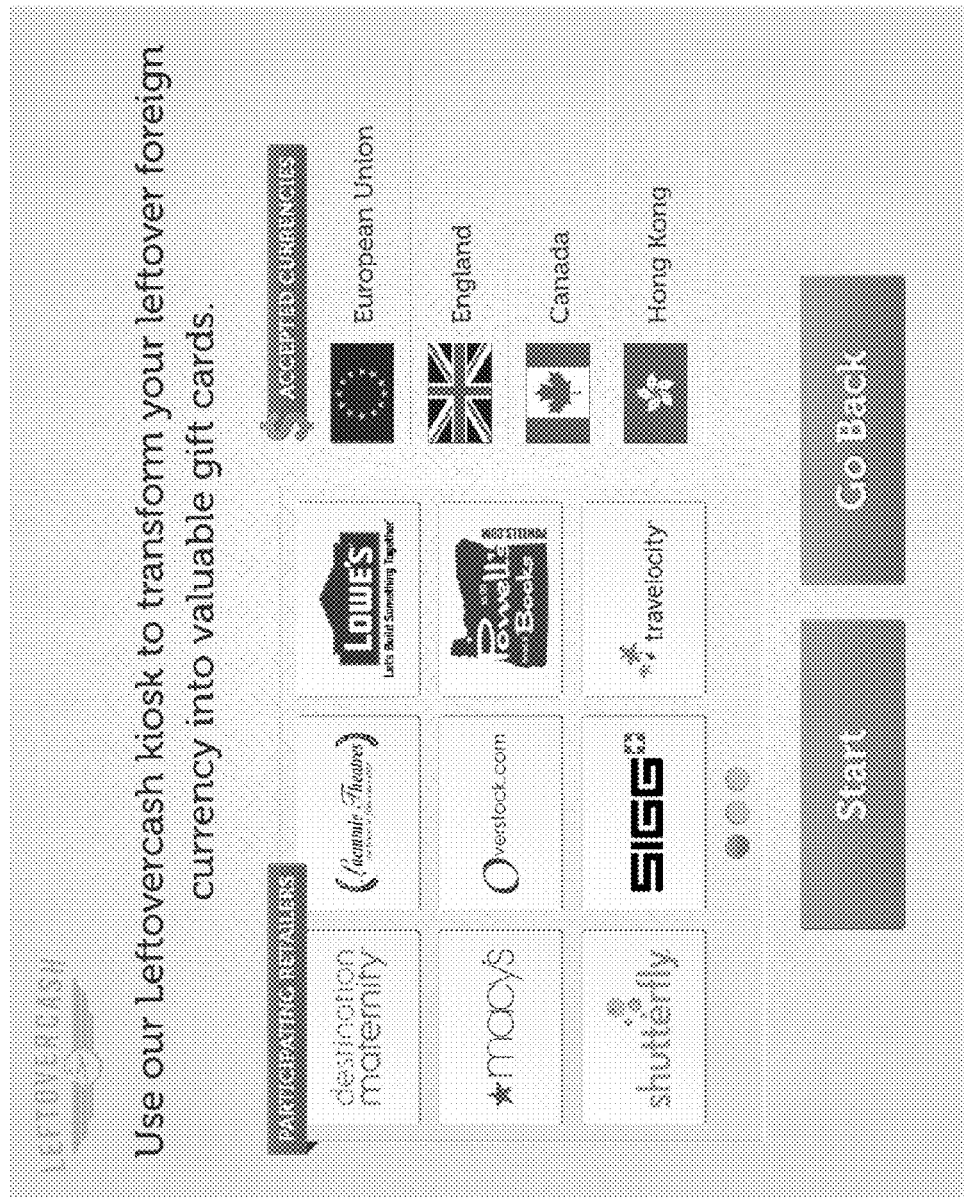
Figure 4:
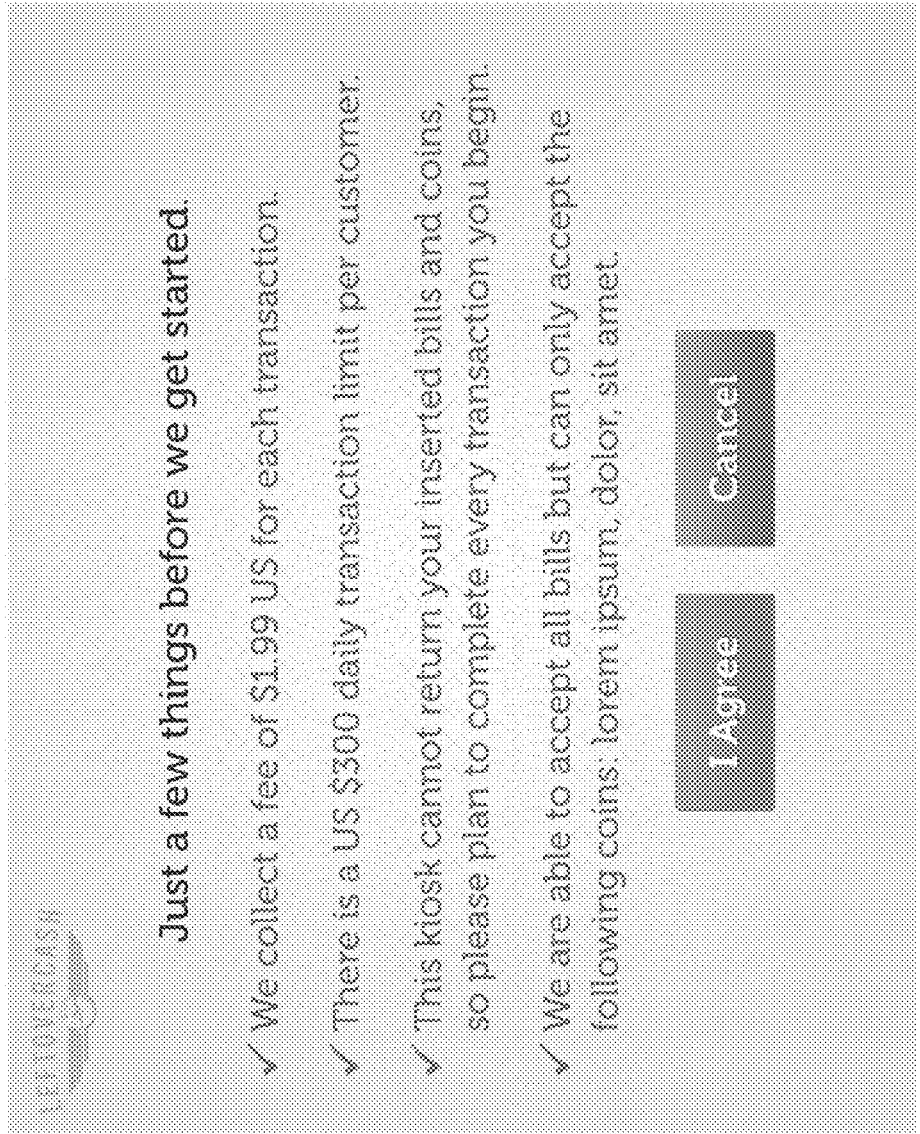
FIG. 4 illustrates an example of a disclosure screen user interface of a kiosk of the foreign currency exchange system.
Figure 5:
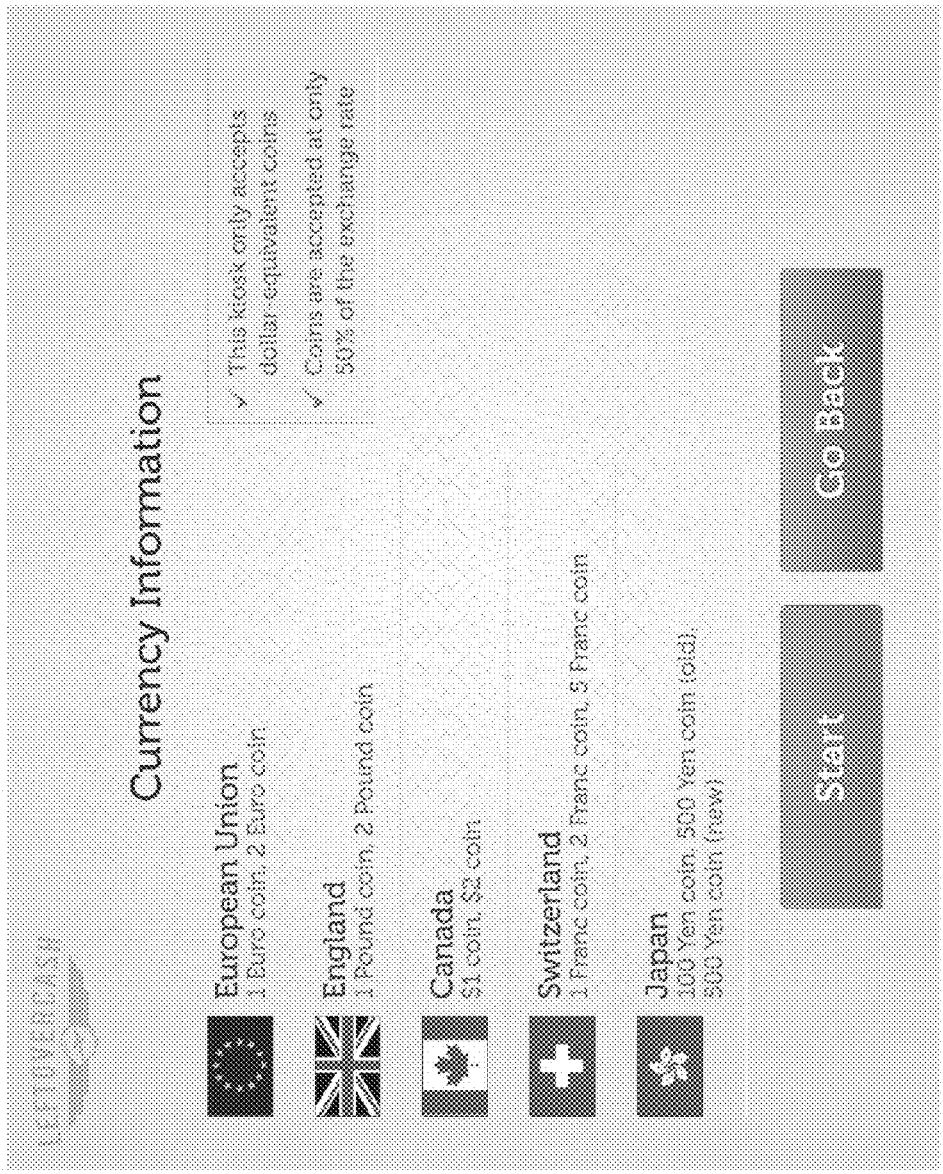
FIG. 5 illustrates an example of a currency information user interface of the kiosk of the foreign currency exchange system.

FIGS. 2A-2C illustrate an example of a method 40 for foreign currency exchange using the foreign currency exchange system. In one implementation, the kiosk may have a touchscreen that allows the user to interact with the kiosk screen. However, the kiosk may be implemented so that the user interacts with the kiosk using typical input devices or by voice commands. When a user begins to interact with the kiosk, the user is presented with a introduction page (an example of the user interface for a touchscreen kiosk is shown in FIGS. 3A and 3B wherein FIG. 3A is a general welcome screen with the overall concept and FIG. 3B illustrates the gift card providers that are partners with the foreign currency exchange system and the accepted currencies for a kiosk based in the US since the accepted currencies are non-US currencies) that sets out the Leftovercash concept (42). From the introduction page, the user can select a learn more item which displays a learn more user interface screen (44). Alternatively, the user may select the start item (46) and be shown a disclosure screen (an example of which for a touchscreen kiosk is shown in FIG. 4.) The disclosure screen lists several disclosures for the user and allows the user to learn more about the different gift cards being offered at the kiosk by selecting a touchscreen item as shown in FIG. 4. The example user interface shown in FIG. 5 is presented to the user to further explain the accepted currencies (and the coins accepted for each currency) as well as the coin currencies rules of the kiosk.

Figure 6:
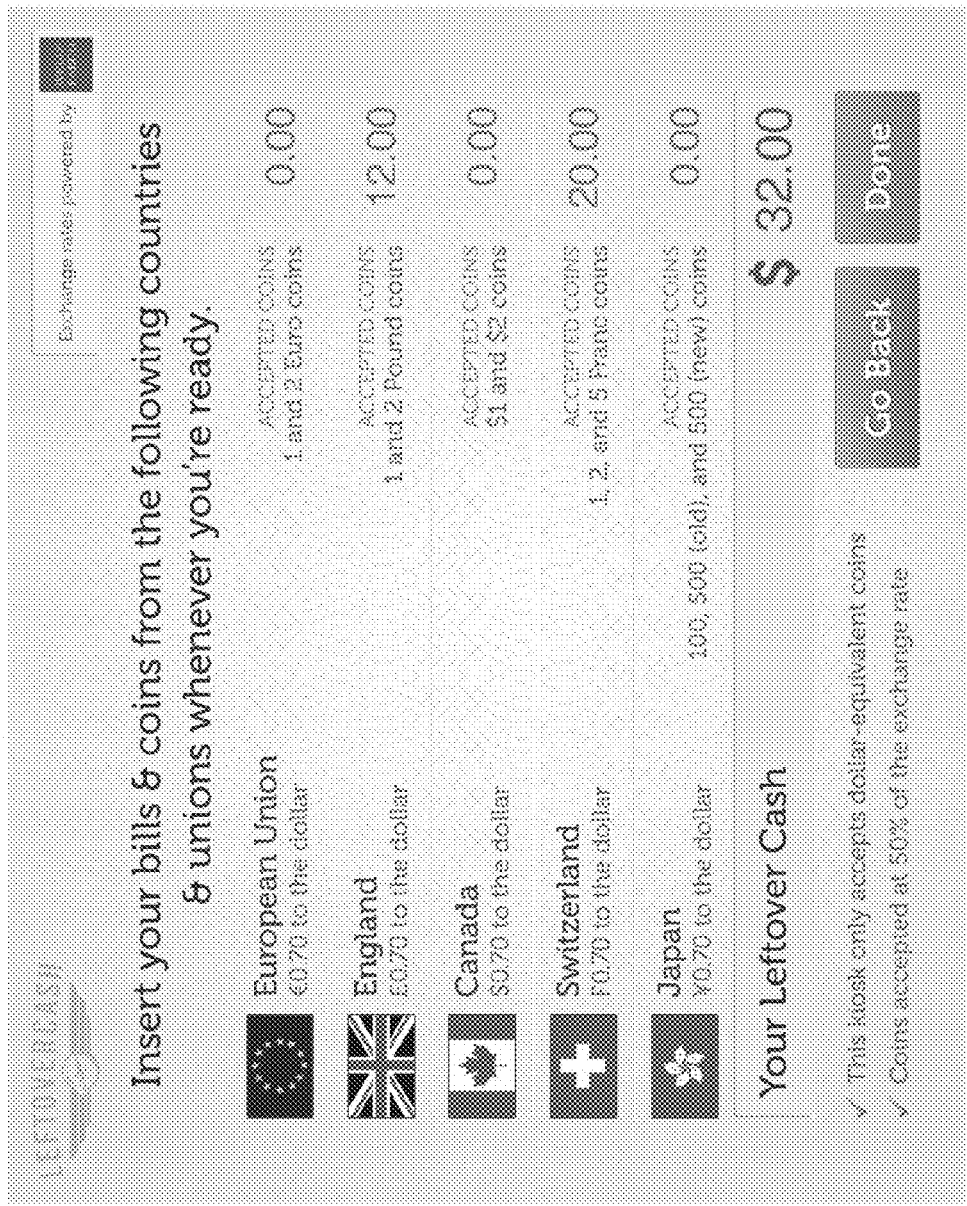
FIG. 6 illustrates an example of a currency insertion/counting user interface of a kiosk of the foreign currency exchange system.

The user then continues to interact with the kiosk (50) by selecting the start button. Next, the exchange rates of the foreign currencies handled by the particular kiosk are displayed to the user (52) (an example of which for a touchscreen kiosk is shown in FIG. 6.) In the example shown in FIG. 6, the particular kiosk can accommodate Canadian dollars, Japanese Yen, British pound sterling, Swiss Francs and European Euros foreign currency.

Figure 7:
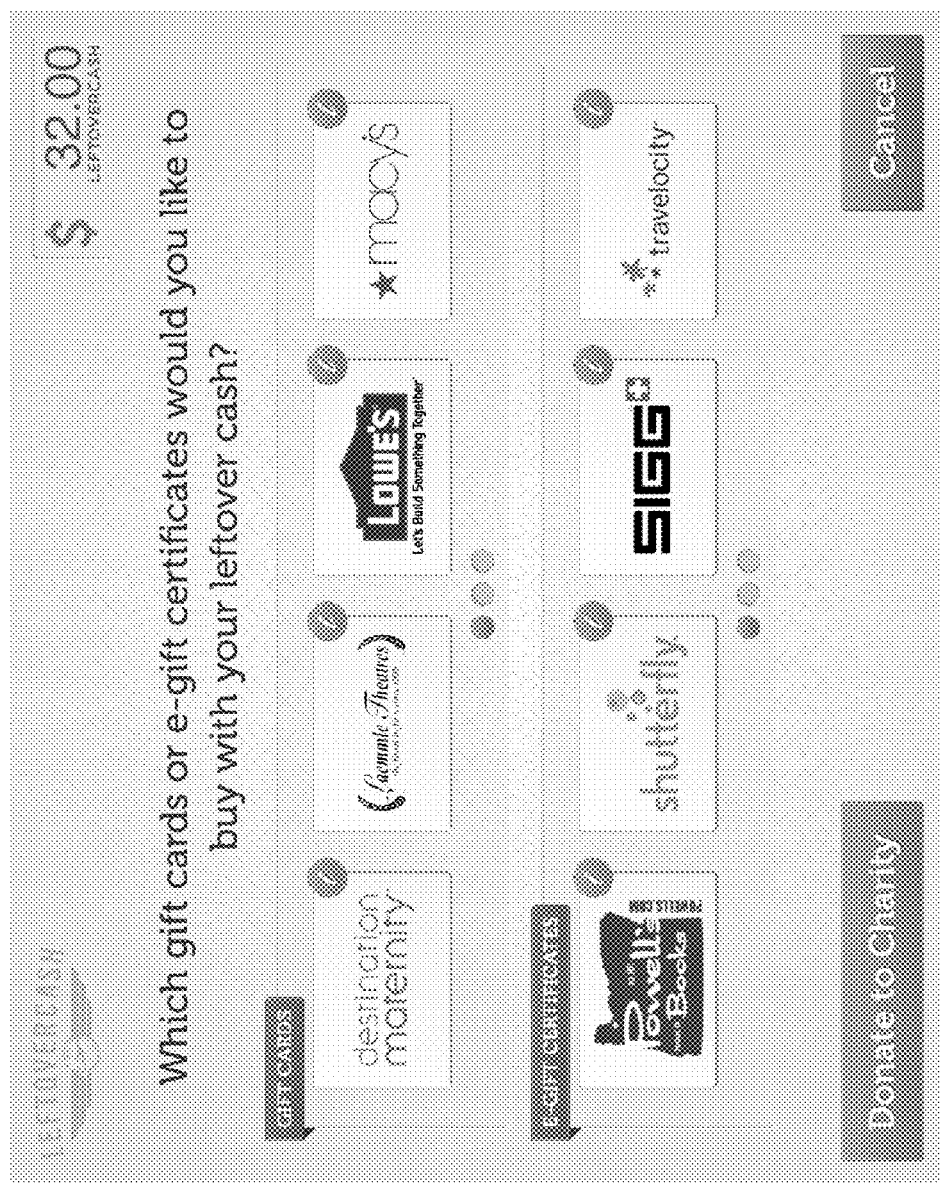
FIG. 7 illustrates an example of a gift card selection user interface of a kiosk of the foreign currency exchange system.

The user interface also instructs the user to insert foreign currency (54) when the user is ready. The kiosk allows the user to insert bills and coins of one or more foreign currencies into the kiosk and a running total of the value of the foreign currency shown in the currency in which the kiosk is located (known as a kiosk currency value) (US dollars in this example since the kiosk is located in the US and an example of the user interface is shown in FIG. 6) is displayed as the user inserts the foreign currency into the kiosk (which means that the kiosk is doing the foreign currency exchange calculations as each bill/coin is inserted into the kiosk or after all bills/coins have been inserted or that the foreign currency exchange calculations is being done remotely and returned to the kiosk.) The value of the foreign currency shown in the currency of the country in which the kiosk is located may be known as a kiosk currency. Once the user has inserted the foreign currency into the kiosk and selected done (as shown in FIG. 6), the user is given options for "spending" the total amount by converting it into vendor gift cards, e-gift certificates or donating the money to a charity or a combination of the above (56) wherein an example of the user interface that presents these options for a touchscreen kiosk is shown in FIG. 7. The example in FIG. 7 lists the vendor gift cards or e-gift certificates that the user can choose on a particular kiosk as well as allows the user to elect to donate the leftovercash to charity (using the "Donate to Charity") user interface button.

Figure 9:
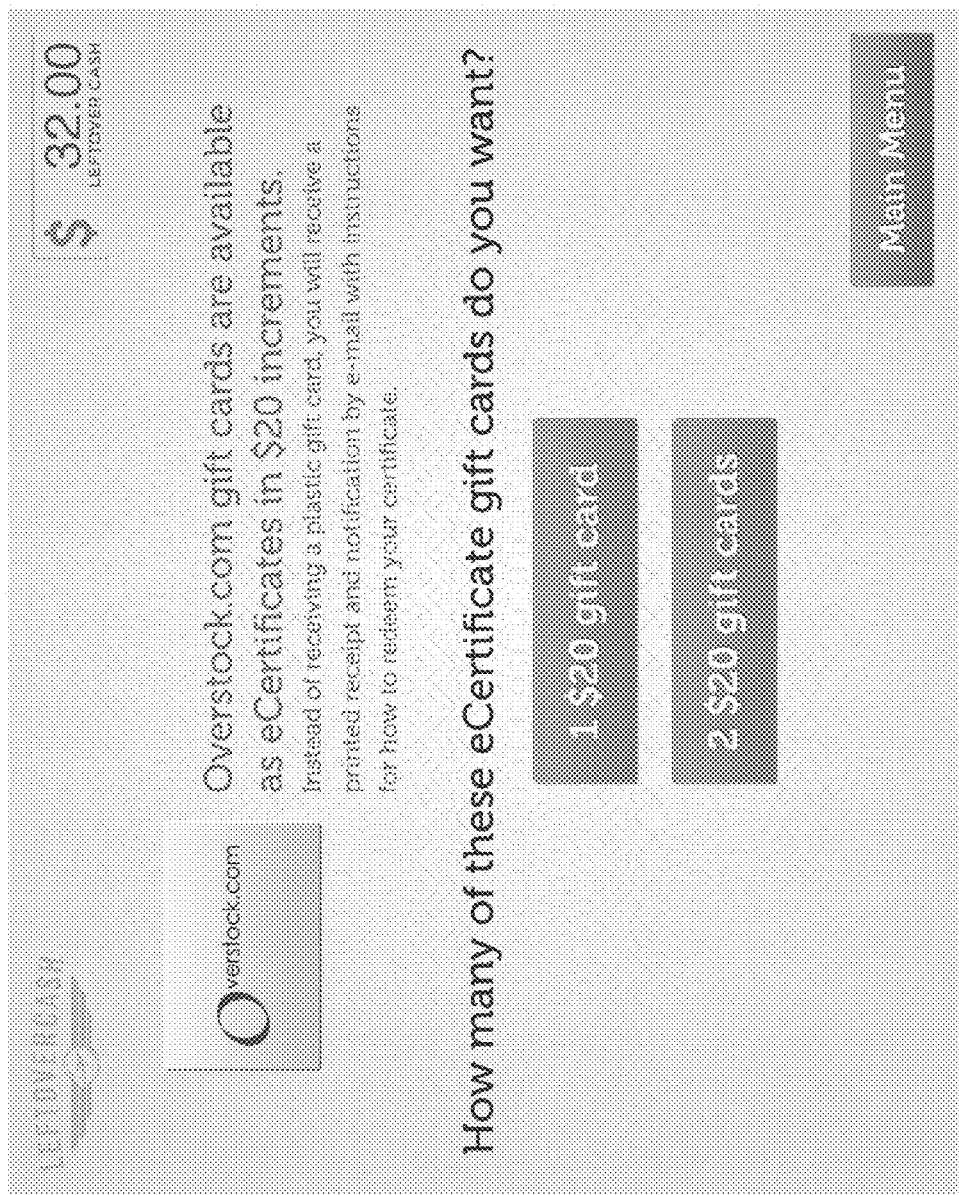
FIG. 9 illustrates an example of a number of gift cards user interface of a kiosk of the foreign currency exchange system.
Figure 10:
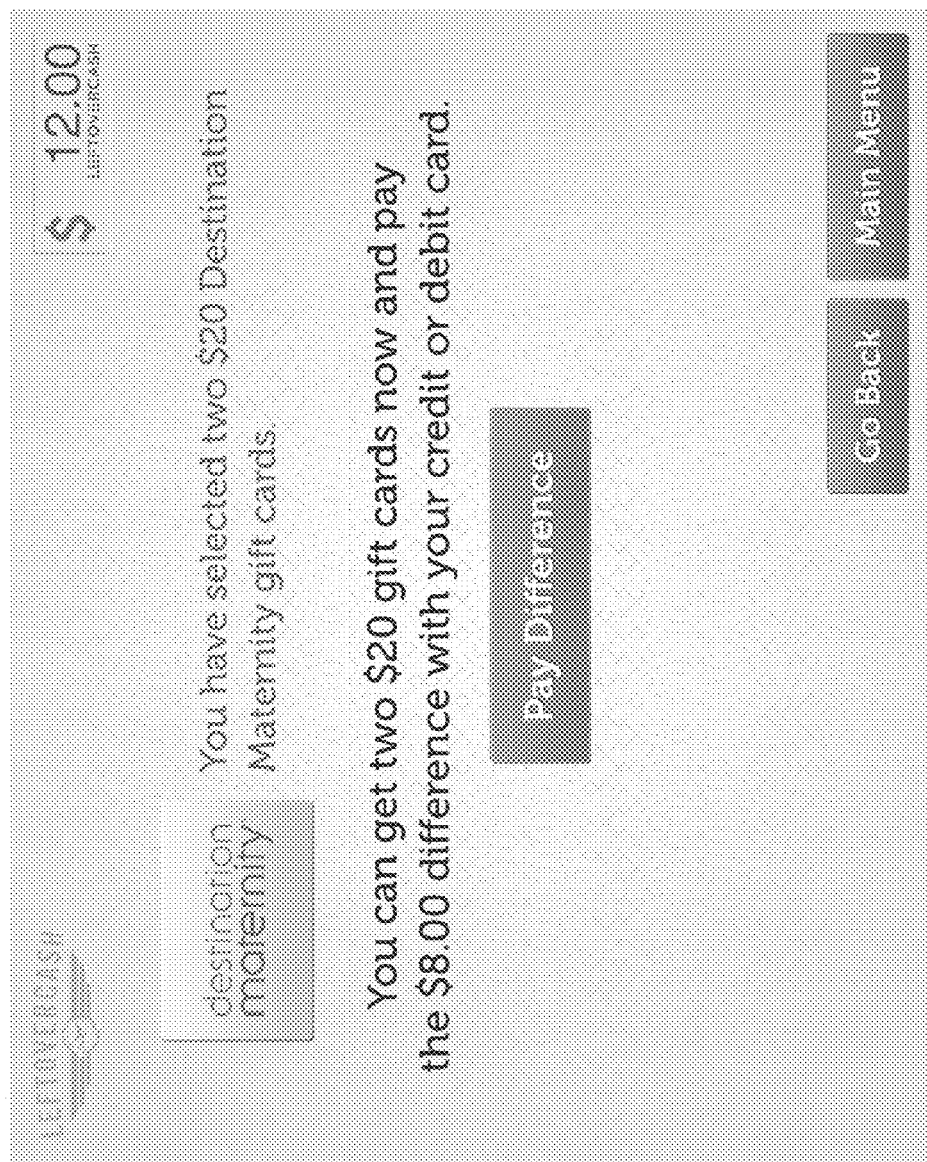
FIG. 10 illustrates an example of a round-up/round-down user interface of a kiosk of the foreign currency exchange system.
Figure 11:
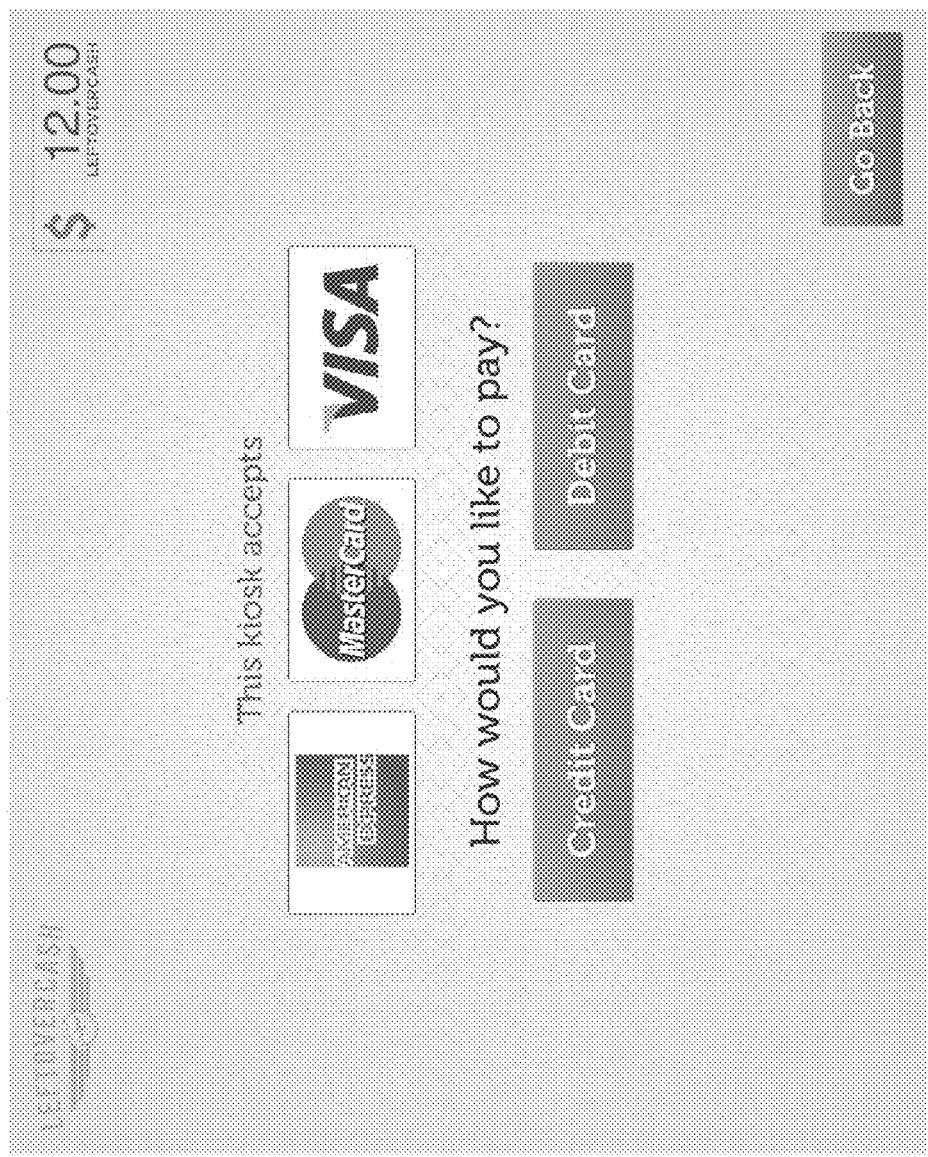
FIG. 11 illustrates an example of a pay for the difference user interface of a kiosk of the foreign currency exchange system.

In more detail, the user interface shown in FIG. 7 allows the user to select a vendor for which the kiosk will dispense a physical gift card (58a) or select a vendor for which the kiosk will dispense an electronic gift certificate (58b), request further information about each of the above using the "i" user interface item as shown in FIG. 7 and/or choose a charity and an amount to donate (with an option to swipe a credit card to donate more money) to the charity (58c). If the user elects to donate the money, the method goes to process 72 that is described in more detail below. If the user elects to get a physical or electronic gift card, the user then selects the number of fixed value gift cards or e-gift certificates that the total value of the exchanged foreign currency is converted into (60) as shown, for example, in FIG. 9. If the amount of the gift cards is not equal to the total amount of the exchanged foreign currency, the kiosk asks the user if they want to add more funds to round up the purchase of the physical or electronic gift certificate (62) wherein an example of the user interface for rounding up the amount for a touchscreen kiosk is shown in FIG. 10. If the user does not want to add funds, then the kiosk allows the user to donate the remaining money to a charity or charities (72).

Figure 8:
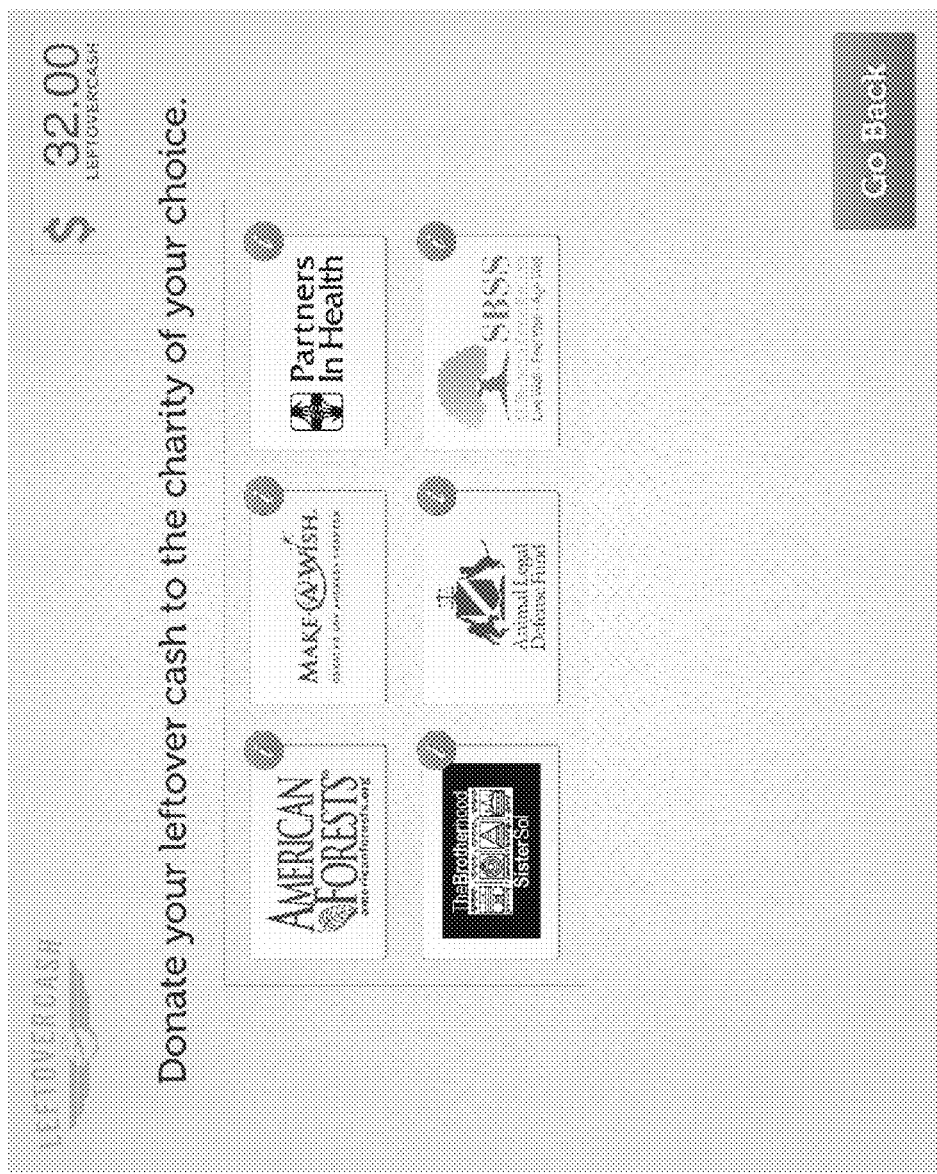
FIG. 8 illustrates an example of a donate to charity user interface of a kiosk of the foreign currency exchange system.

If the user elects to donate the leftovercash to charity, then the user interface shown in FIG. 8 is displayed to the user so that the user can: 1) learn more about each charity; and/or 2) select a charity to which to donate the leftovercash.

If the user elects the add money to round up, the kiosk allows the user to round up to $10 by adding $x.xx (64a), allows the user to round up to $20 by adding $x.xx (64b) or allows the user to round up to $YYY by adding $x.xx (64c). Once the user has rounded the amount up to the amount of the one or more physical and/or electronic gift cards, the kiosk dispenses the physical and/or electronic gift cards (66).

Once the gift cards are dispensed or the user has donated the extra exchanged foreign currency to a charity or charities, the kiosk asks the user if the user has more foreign currency to insert and exchange using the kiosk (68,74). If the user has more foreign currency to exchange, the method loops back to process 54 as shown in FIG. 2A. Otherwise, the method is completed (76) a receipt is printed.

In addition to the method of converting leftover currency into gift cards or donating to a charity as described above, the kiosk may also permit a customer/user to withdraw foreign currency that was inserted into the kiosk by another customer so that the customer may withdraw foreign currencies from the kiosk. For this implementation, the kiosk may have a bill acceptor that can also dispense bills. The kiosk also will track the amount of foreign bills that have been inserted into the kiosk and thus allow customers to purchase it from the kiosk. For this implementation, the kiosk may also have internal storage bins inside the kiosk so that currencies and denominations can all be stored separately.

In addition to the gift cards described above, the kiosk may also, or alternatively, dispense a LeftoverCash card ("stored foreign currency value card") to the user. The stored foreign currency value card allows the customer a place to temporarily store his/her inserted foreign currency value electronically and defer the decision of which vendor's gift card/e-gift certificate to purchase and/or which charity to make a donation to with the exchanged foreign currency value. In the method above, instead of opting to purchase a specific vendor's gift card or e-gift certificate, and/or making a donation to a specific charity, the customer can opt to purchase a Leftovercash card for the exact amount of his/her inserted foreign currency. When the user/customer selects this option, the kiosk will email the user/customer a code that tracks the amount of value that he/she has on file with Leftovercash. Later, the customer can visit a website associated with the foreign currency exchange system and at her/his leisure, browse through all the vendors and charities that he/she can purchase a gift card from or make a donation to. Once decided, the user can use the issued code to make the purchase and/or donation. This allows the customer to take more time on our website to learn about our various vendors and charities and to make a more informed decision rather than having to immediately decide how to spend his/her inserted leftovercash in front of our kiosk. In all of the transactions discussed above, the user can insert one type of currency or multiple different currencies into the kiosk as shown for example in FIG. 6 and then purchase a gift card and/or donate to a charity using the entire value of all of the currencies.

The kiosk may also provide a multi-Currency Cash Debit Card that offers customers the ability to electronically store the various inserted currencies on one multi-currency debit card. Instead of converting inserted currencies into a vendor gift card, e-gift certificate or Leftovercash card, and/or making a donation to a charity, the customer may be given the option of storing his/her various inserted currencies onto a multi-currency debit card. The multi-currency debit card will be similar to the various Visa, MC, Amex, Discover cash debit cards that are currently available, however, it will offer the ability to store balances in various currencies. For example, if our customer inserts Australian dollars, Swiss Francs and Euros, our kiosk will tabulate his/her 3 insertions and convert it into one Multi-currency debit card (less our fees) that can be used like cash anywhere other debit cards may be used.

The system may also gather and store customer information during a transaction (gender of user, currency exchanged, gift cards requested, etc.) and the selections of the user during the transaction. The system may use this customer information for various uses, such as, for example, to periodically adjust the cards being dispensed at each kiosk.

The system may also have the ability to limit a particular customer's daily transacted kiosk currency value which means that near the beginning of the process, we will run a search of our transaction database to see how much kiosk currency value has already been inserted by this customer during this calendar day at this and all other kiosks within our network of kiosks, and then only allow that customer to proceed if their maximum daily transacted kiosk currency value has not yet been reached.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A currency exchange system comprising:
   a kiosk with a physical housing;
   a user input device within the housing configured to accept input from a user;
   a plurality of currency acceptor mechanisms within the housing configured to accept foreign currencies from a plurality of different countries into the kiosk during a single transaction, wherein each foreign currency accepted into the kiosk is a currency for a country in which the kiosk is not physically located;
   a card dispenser mechanism within the housing configured to dispense a physical gift card to the user from the kiosk; and,
   a core computer coupled to the user input device, the currency adapter mechanisms, and the card dispenser comprising a processor, non-transient memory, and a plurality of lines of computer code configured to:
   store current foreign currency exchange rates between the plurality of foreign currencies and a kiosk currency of the country in which the kiosk is physically located;
   receive daily updates of the foreign currency exchange rates between the plurality of foreign currencies and the kiosk currency of the country in which the kiosk is physically located;
   determine total amounts of the foreign currencies from the plurality of different countries received by the currency acceptor mechanisms during the single transaction with the kiosk;
   determine a total kiosk currency value by calculating a kiosk currency for each received foreign currency using the stored current foreign current exchange rate for each received foreign currency and summing the kiosk currency for each received foreign currency to determine the total kiosk currency value that is a total value of all of the foreign currencies in the currency of the country in which the kiosk is physically located; and,
   deliver by the kiosk, based on inputs by the user into the user input device, one or more of a physical gift card dispensed using the card dispenser mechanism, an electronic gift card, and a donation to a charity in an amount of the total kiosk currency value.

2. The system of claim 1, wherein the currency acceptor mechanisms further comprises a bill acceptor mechanism that accepts and counts bill foreign currency and a coin acceptor mechanism that accepts and counts coin foreign currency.

3. The system of claim 1, wherein the kiosk currency value is a United States dollar value and the plurality of foreign currencies accepted into the kiosk are two or more of Japanese yen, British pound sterling, European Union euros, Swiss Francs and Canadian dollars.

4. The system of claim 1 further comprising a foreign exchange system remote from the kiosk that periodically updates the set of stored foreign currency exchange rates via a wired or wireless network.

5. The system of claim 1 further comprising a foreign exchange system remote from the kiosk that converts the total value of the currencies received by the currency acceptor mechanisms into the kiosk currency value and transmits the kiosk currency value to the kiosk.

6. The system of claim 1 further comprising a backend system that communicates with the kiosk to handle credit card clearing operations.

7. A method for foreign currency exchange, comprising:
storing current foreign currency exchange rates between the plurality of foreign currencies and a kiosk currency of a country in which a kiosk is physically located, wherein the kiosk comprises a housing, a user input device, a plurality of currency acceptor mechanisms, a card dispenser mechanism, and a core computer further comprising a processor, non-transient memory, and a plurality of lines of computer code;
receiving daily updates of the foreign currency exchange rates between the plurality of foreign currencies and the kiosk currency of the country in which the kiosk is physically located;
determining total amounts of foreign currencies from a plurality of different countries received by the currency acceptor mechanisms during a single transaction with the kiosk, wherein each foreign currency is a currency for a country in which the kiosk is not physically located;
determining a total kiosk currency value by calculating a kiosk currency for each received foreign currency using the stored current foreign current exchange rate for each received foreign currency and summing the kiosk currency for each received foreign currency to determine the total kiosk currency value that is a total value of all of the foreign currencies in the currency of the country in which the kiosk is physically located; and,
delivering by the kiosk, based on inputs by the user into the user input device, one or more of a physical gift card dispensed using the card dispenser mechanism, an electronic gift card, and a donation to a charity in an amount of the kiosk currency value.

8. The method of claim 7, wherein inserting foreign currency further comprises inserting, using a bill acceptor mechanism of the kiosk, bill foreign currency and inserting, using a coin acceptor mechanism of the kiosk, coin foreign currency.

9. The method of claim 7, wherein the kiosk currency value is a United States dollar value and the plurality of foreign currencies accepted into the kiosk are two or more of Japanese yen, British pound sterling, European Union euros, Swiss Francs and Canadian dollars.

10. The method of claim 7 further comprising periodically updating the set of stored foreign currency exchange rates via a wired or wireless network with the foreign exchange rates from a foreign exchange system remote from the kiosk.

11. The method of claim 7 further comprising converting, using a foreign exchange system remote from the kiosk, the total amounts of the foreign currencies received into the kiosk currency value and transmitting the kiosk currency value to the kiosk.

12. The method of claim 7 further comprising determining if a particular user has exceeded a maximum kiosk currency value during a predetermined period and delivering one or more of the physical gift card, the electronic gift card and the donation to a charity occurs if the particular user has not exceeded the maximum kiosk currency value during the predetermined period.

13. The method of claim 7 further comprising requesting the user to make up a difference between the kiosk currency value and a value of one of the physical gift card and the electronic gift card.

14. The system of claim 1, wherein each of the physical gift card and the electronic gift card have a fixed value.

15. The method of claim 7, wherein each of the physical gift card and the electronic gift card have a fixed value.

16. The system of claim 1, wherein the core computer further delivers a stored foreign currency value card that electronically stores the value of the foreign currency accepted by the currency acceptor mechanisms instead of delivering one or more of the physical gift card, the electronic gift card and the donation to the charity.

17. The method of claim 7, wherein delivering by the kiosk further comprises delivering a stored foreign currency value card that electronically stores the value of the foreign currency accepted by the currency acceptor mechanisms instead of delivering one or more of the physical gift card, the electronic gift card and the donation to the charity.

* * * * *